(12) United States Patent
Helmersson

(10) Patent No.: US 8,917,808 B2
(45) Date of Patent: Dec. 23, 2014

(54) DEVICE FOR HANDLING A FUEL ASSEMBLY

(75) Inventor: Sture Helmersson, Kolbäck (SE)

(73) Assignee: Westinghouse Electric Sweden AB, Vasteras (SE)

( * ) Notice: Subject to any disclaimer, the term of this patent is extended or adjusted under 35 U.S.C. 154(b) by 1372 days.

(21) Appl. No.: 12/440,633

(22) PCT Filed: Aug. 21, 2007

(86) PCT No.: PCT/SE2007/050563
§ 371 (c)(1),
(2), (4) Date: Feb. 1, 2010

(87) PCT Pub. No.: WO2008/033087
PCT Pub. Date: Mar. 20, 2008

(65) Prior Publication Data
US 2010/0142667 A1    Jun. 10, 2010

(30) Foreign Application Priority Data

Sep. 12, 2006 (SE) .................................. 0601872

(51) Int. Cl.
*G21C 19/00* (2006.01)
*G21C 19/04* (2006.01)
*G21C 19/10* (2006.01)

(52) U.S. Cl.
CPC ............... *G21C 19/04* (2013.01); *G21C 19/10* (2013.01); *G21Y 2002/207* (2013.01); *G21Y 2002/303* (2013.01); *G21Y 2004/30* (2013.01); *G21Y 2004/40* (2013.01)
USPC ........................... 376/271; 376/260; 376/268

(58) Field of Classification Search
USPC .......... 376/260, 261, 264, 268, 271; 417/217, 417/423.3
See application file for complete search history.

(56) References Cited

U.S. PATENT DOCUMENTS

| 4,096,032 A | 6/1978 | Mayers et al. |
| 4,847,042 A * | 7/1989 | Musiol et al. ................. 376/316 |

(Continued)

FOREIGN PATENT DOCUMENTS

| DE | 42 38 563 | 5/1994 |
| EP | 0 570 905 | 11/1993 |

(Continued)

OTHER PUBLICATIONS

International Search Report for PCT Application No. PCT/SE2007/050563; Filed Aug. 21, 2007; Date of Completion Dec. 20, 2007; Date of Mailing Dec. 20, 2007.

(Continued)

*Primary Examiner* — Jack W Keith
*Assistant Examiner* — Marshall O'Connor
(74) *Attorney, Agent, or Firm* — Alston & Bird LLP

(57) ABSTRACT

The invention refers to a device and a method for handling a fuel assembly (3), which comprises a number of fuel rods extending between a lower part and an upper part of the fuel assembly, a debris filter located in the lower part of the fuel assembly and a casing surrounding the fuel rods. The device comprises a lifting device (15) for engaging, during a lifting operation, a fuel assembly located in a reactor vessel (1) and lifting the fuel assembly upwards and out from the reactor vessel. A conduit member is connected to the upper part of the fuel assembly. A pump (32) creates a flow of water through the conduit member and the fuel assembly during the lifting operation. The flow has such a size that possible debris particles contained in and/or immediately beneath the debris filter at least are retained in and/or immediately beneath the debris filter during the lifting operation.

10 Claims, 2 Drawing Sheets

(56) References Cited

U.S. PATENT DOCUMENTS

| | | | |
|---|---|---|---|
| 4,968,477 A | | 11/1990 | Savinelli et al. |
| 5,092,355 A | | 3/1992 | Cadwell et al. |
| 5,383,226 A | * | 1/1995 | Deleryd et al. ............... 376/253 |
| 5,546,435 A | | 8/1996 | Collin et al. |
| 6,942,448 B1 | * | 9/2005 | Pemberton ................... 415/102 |

FOREIGN PATENT DOCUMENTS

| | | |
|---|---|---|
| GB | 1 214 998 | 12/1970 |
| JP | 62-170898 A | 7/1987 |
| JP | 62-174695 A | 7/1987 |
| JP | 07-167983 A | 7/1995 |
| JP | 08-220285 A | 8/1996 |
| WO | WO 98/28752 | 7/1998 |
| WO | WO 02/058075 | 7/2002 |

OTHER PUBLICATIONS

International Preliminary Report on Patentability for PCT/SE2007/050563 dated Mar. 17, 2009.

Japan Patent Office, Notice of Reasons for Rejection for Application No. 2009-527322, Oct. 30, 2012, 3 pages, Japan.

Japan Patent Office, Notice of Reasons for Rejection for Application No. 2009-527322, Sep. 3, 2013, 2 pages, Japan.

* cited by examiner

US 8,917,808 B2

DEVICE FOR HANDLING A FUEL ASSEMBLY

CROSS REFERENCE TO RELATED APPLICATIONS

This application is a National Stage Application, filed under 35 U.S.C. §371, of International Application No. PCT/SE2007/050563, filed Aug. 21, 2007, which claims priority to Swedish Application No. 0601872-5, filed Sep. 12, 2006; the contents of both of which are hereby incorporated by reference in its entirety.

THE FIELD OF THE INVENTION

The present invention refers generally to fuel assemblies for nuclear plants and handling of fuel assemblies in connection with shutdown and maintenance of nuclear plants. Especially, the present invention refers to a device for handling fuel assemblies, and a method for handling fuel assemblies. The invention especially refers to light water reactors and in particular boiling water reactors, BWR.

THE BACKGROUND OF THE INVENTION AND PRIOR ART

In such reactors, water, the purpose of which is to function as coolant and moderator in the nuclear reactor in the nuclear plant, circulates. It is important to keep this water clean from debris. If debris particles are allowed to accompany the water in the core of the reactor, these may cause defects to the cladding of the fuel rods, which can lead to such defects that nuclear fuel, i.e. uranium, leaks out into the water. The debris particles can of course also cause defects on other components in the nuclear plant, for instance pumps.

With debris particles is to be understood in this application different particles such as for instance metal chips, formed in connection with various repairs of components of the plant, metal wires or other foreign particles which have entered the plant from outside, objects such as nuts, screws, smaller tools etc. Particularly difficult debris particles are such with an elongated shape, i.e. thin wires or chips which may have a length of down to about 7-8 mm. Such debris particles tend to get attached higher up in the fuel assembly, for instance in spacers. The particles vibrate in the coolant stream and may wear the cladding of the fuel rod so that a hole arises.

In order to solve this problem, it is known to provide some kind of debris filter in the lower part of the fuel assemblies, which comprise a number of fuel rods and which form the core of the reactor. One example of such a debris filter is disclosed in WO02/058075. The water, which circulates through the reactor during the operation of the plant, passes through this lower part of the fuel assemblies upwardly from below. Possible debris particles may thus be caught by one such debris filter. The debris particles are prevented at least to a certain extent from being released from the debris filter and conveyed back to the water due to the flowing of the water through the debris filter. Debris filters are normally also designed to let through smaller debris particles and in such a way reduce the risk of being stopped up. The flow through the lower part of the fuel assembly is during normal operation about 2 m/s but may at reduced power be decreased to about 1 m/s.

In connection with shutdown of the reactor, the flow of water is maintained at least initially due to the rest heat which is present in the fuel assembly. It is also possible, during an initial phase of the revision, to operate the main circulation pumps of the plant with a relatively low power sufficient for maintaining a flow of water through the fuel assemblies. Each fuel assembly is standing in a seat and water is guided during normal operation into the fuel assembly via a sealing. When the fuel assembly is to be removed and lifted out from the reactor, the flow of water will, however, be reduced and it can even be reversed depending on the speed with which the fuel assembly is lifted upwardly. This lifting speed can during a normal shutdown amount to about 1 m/s. This means that the force which is created by the flow and retains the debris particles in or immediately beneath the debris filter, is reduced or ceases and that the debris particles may fall out from the debris filter. Consequently, the tendency for the particles to be released and fall back to the reactor vessel increases. This means that there is no longer any mechanism for removing the debris particles from the reactor and the primary system, but more and more debris particles will be accumulated in the reactor vessel.

U.S. Pat. No. 5,383,226 discloses a device for handling a fuel assembly, which comprises a number of fuel rods extending between a lower part and an upper part of the fuel assembly and a casing surrounding the fuel rods. The device comprises a lifting device which is arranged during a lifting operation to engage a fuel assembly located in a reactor vessel and to lift the fuel assembly upwardly and out from the reactor vessel. A conduit member is connected to the upper part of the fuel assembly and a pump is arranged to create a flow of liquid through the fuel assembly and the conduit member to a detecting equipment. The detecting equipment is adapted to detect fission products in the water, which can indicate that one or several fuel rods are defect.

SUMMARY OF THE INVENTION

The object of the present invention is to reduce the accumulation of debris particles in the reactor vessel.

This object is achieved by the device initially defined, which is characterized in that the pump is arranged to provide a flow of such a size that possible debris particles, which are contained in and immediately beneath the debris filter at least are retained in and/or immediately beneath the debris filter during the lifting operation.

By means of such a device it may thus be ensured that the quantity of debris particles which are released during the lifting operation is very small. The quantity of accumulated debris particles in the reactor vessel may thus be reduced. The applicant has during experiments concluded that the floating speed of the debris particles, i.e. the speed with which they sink in the water, amounts to approximately 0.1-0.3 m/s. This means that the created flow of water through the fuel assembly at the inlet of the fuel assembly ought to amount to at least 0.5 m/s in order to be able to ensure that the debris particles do not fall down from the debris filter. Consideration is then to be given to the lifting speed used, see above. The inlet of the fuel assembly is its thinnest section and consequently determines if the debris particles may fall out.

According to an embodiment of the invention, the device is arranged to control the pump in such a way that the flow is maintained during the whole lifting operation. Advantageously, the device may also be arranged to control the pump in such a way that the flow is initiated as soon as the lifting operation has been initiated.

According to a further embodiment of the invention, the lifting device comprises an elongated grip element, which is arranged to be submerged in the reactor vessel and to engage the fuel assembly, wherein the pump is provided on the grip element. Such a grip element is available at the most of the present nuclear plants and is well adapted also to carry the defined pump. Advantageously, the pump may be provided adjacent to the upper part of the fuel assembly.

According to a further embodiment of the invention, the conduit member is arranged to convey the flow to a position outside the fuel assembly. The flow of water may thus be conveyed back to the water in the reactor vessel, since the debris particles are retained in the debris filter.

According to a further embodiment of the invention, the device comprises a collecting member, which is connected to the conduit member and arranged to collect the debris particles accompanying the flow of water through the fuel assembly. By means of such a collecting member, which may be provided upstream or downstream the pump, the debris particles, which for any reason are present in the flow channel of the fuel assembly when the lifting operation is initiated or pass through the debris filter, are caught and collected. Such a collection is especially advantageous in the case that the flow of water is conveyed back to the reactor vessel. The collecting member may advantageously comprise a filter and/or a container.

According to a further embodiment of the invention, the conduit member comprises a cover, which is arranged to be provided on the upper part of the fuel assembly and which defines a passage for said flow. The cover suitably has such dimensions that it sealingly encloses the fuel assembly so that the whole flow through the fuel assembly is conveyed into and through the conduit member.

According to a further embodiment of the invention, the debris filter is provided in such a way that all water flowing into the flow channel flows through the debris filter.

According to a further embodiment of the invention, the lifting device is arranged to transport the lifted fuel assembly to a water pool at a distance from the reactor vessel, wherein the device is arranged to control the pump in such a manner that the flow is maintained during the whole of this transport. In such a way, debris particles are prevented from falling out from the fuel assembly also during the transport and from contaminating the transport path. Advantageously, the device may be arranged to control the pump in such a manner that the flow of water through the fuel assembly is reversed in a position where the debris particles are depositable, for instance when the transport is finished. Consequently, at least a part of the debris particles, which are retained in and/or immediately beneath the debris filter, may be permitted to fall down and at any suitable occasion be collected and removed.

The object is also achieved by the method initially defined, which is characterized in that the flow has such a size that possible debris particles which are contained in and/or immediately beneath the debris filter at least are retained in and/or immediately beneath the debris filter during the lifting operation.

Advantageous further developments of the method are defined in the dependent claims.

BRIEF DESCRIPTION OF THE DRAWINGS

The present invention is now to be explained more closely through a description of various embodiments and with reference to the drawings attached hereto.

DETAILED DESCRIPTION OF VARIOUS EMBODIMENTS OF THE INVENTION

Figure 1:
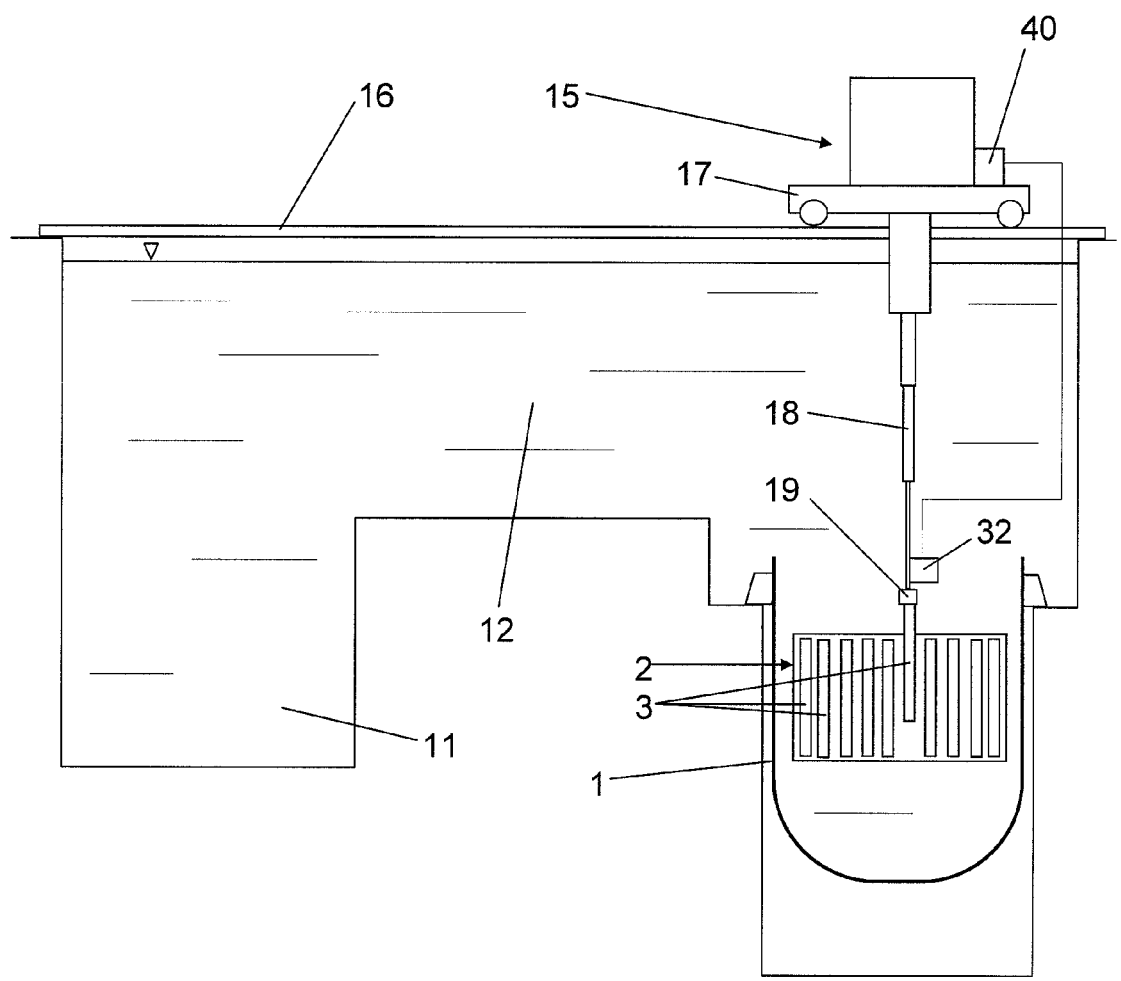
FIG. 1 discloses schematically a view of an embodiment of a device for handling a fuel assembly according to the invention.
Figure 2:
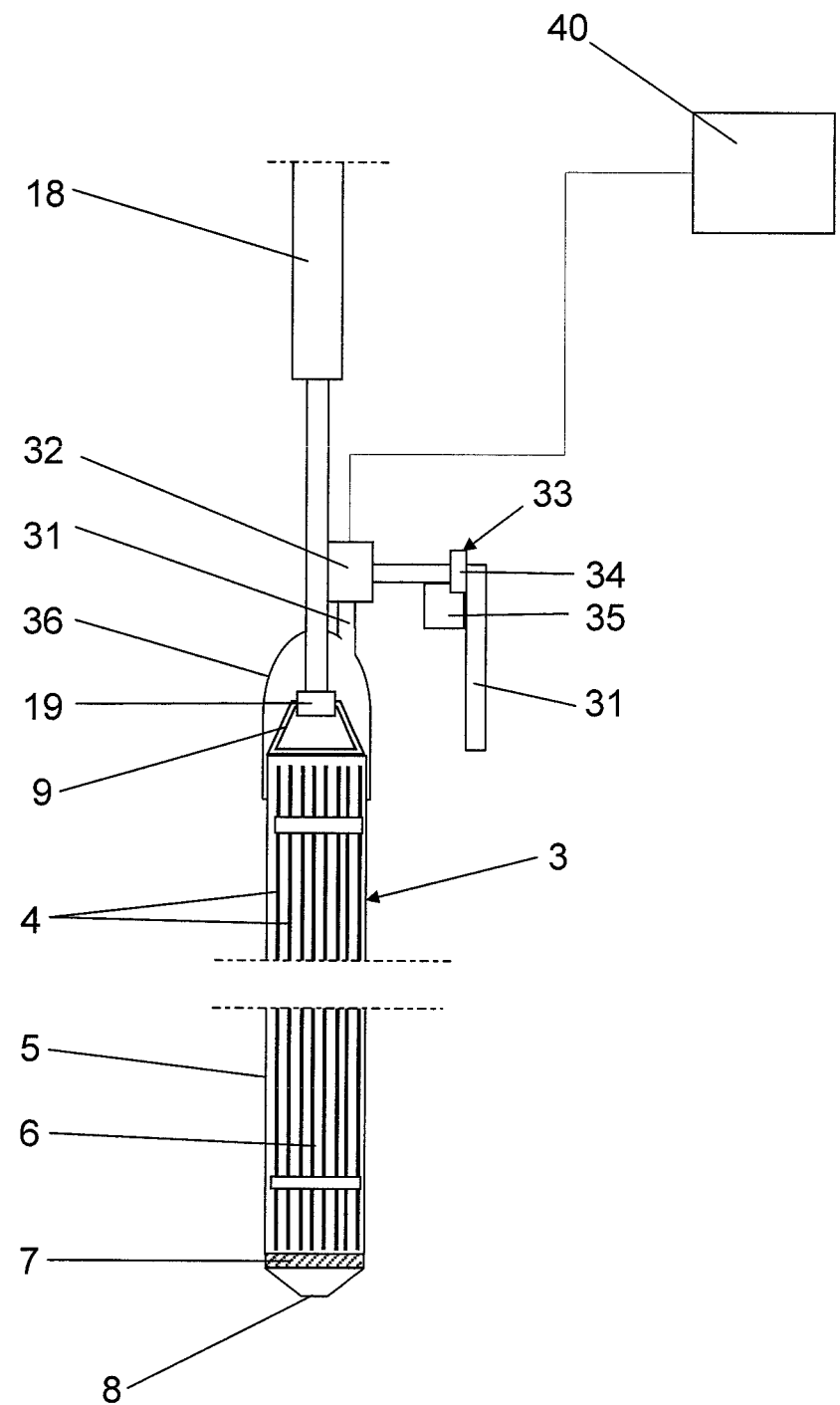
FIG. 2 discloses schematically a view of a fuel assembly and a part of the device in FIG. 1.

FIG. 1 discloses schematically a nuclear plant with a boiling water reactor, BWR. The plant comprises a reactor vessel 1 having a core 2 of fuel assemblies 3. A fuel assembly 3 is disclosed schematically in FIG. 2. Each fuel assembly 3 in the core 2 comprises a number of fuel rods 4, which extend between a lower part and an upper part of the fuel assembly 3. A casing 5 surrounds the fuel rods 4 and forms a flow channel 6 in which the fuel rods 4 are located. A debris filter 7 is provided in the lower part of the fuel assembly 3 at an inlet 8 of the fuel assembly 3. The debris filter 7 is provided in such a manner that all water flowing through the inlet 8 into the flow channel 6 flows through the debris filter 7. A handle 9 is provided at the upper part of the fuel assembly 3.

The plant disclosed in FIG. 1 is shut down and the cover of the reactor vessel 1 is removed. The reactor vessel 1 is thus open at the top. Moreover, the plant comprises a water pool 11 which is provided at a distance from the reactor vessel 1. A transport path 12 extends between the reactor vessel 1 and the water pool 11. The reactor vessel 1, the transport path 12 and the water pool 11 form in the shut down state a common space which is filled with water up to a water surface.

Furthermore, the plant comprises a device for handling a fuel assembly. This device comprises a lifting device 15 which is provided on a horizontal rail device 16 extending over the reactor vessel 1, the transport path 12 and the water pool 11. The lifting device 15 comprises a carriage 17 which is displaceable on and along the rail device 16. On the carriage 17 a grip element 18 is suspended, which is designed as a telescopic pipe and which thus can be extended and shortened. At the lower end of the grip element 18 there is a gripping tool 19 which is arranged to engage a handle 9 of the fuel assembly 3. By means of the lifting device 15, a fuel assembly may be engaged in the handle 9 during a lifting operation and lifted up from the core 2 and the reactor vessel 1. When the fuel assembly 3 has reached an upper position, which still is situated beneath the water surface, the lifting device 15 may be displaced along the rail device 16, wherein the fuel assembly 3 is transported under water from the reactor vessel 1 to the water pool 11 via the transport path 12. In the water pool 11, the fuel assembly 3 may be submerged and put into a suitable device (not disclosed) at the bottom of the water pool 11.

The device for handling a fuel assembly 3 also comprises a conduit member 31, which is connectable to the upper part of the fuel assembly 3 and a pump 32 which is attached to the grip element 18 in the proximity of the griping tool 19 and the upper part of the fuel assembly 3. The pump 32 is provided on the conduit member 31 and arranged to permit pumping of a flow of water through the conduit member 31 and the fuel assembly 3. In the embodiment disclosed, the conduit member 31 is arranged to convey the flow of water to a position outside the fuel assembly and close to the fuel assembly 3. This means that when the fuel assembly 3 is located in or immediately above the reactor vessel, the pumped water will be conveyed back to the reactor vessel 1. In the same way, the pumped water will when the fuel assembly 3 is located along the transport path 12 or in the water pool 11, be conveyed back to the transport path 12 and the water pool 11, respectively.

Furthermore, the device may comprise a collecting member 33, which is connected to the conduit member 31 and arranged to collect the debris particles accompanying the flow of water through the fuel assembly 3. The collecting member 33 is in the embodiment disclosed provided downstream the pump 32, but it is also possible to provide the collecting member 33 upstream the pump 32. In the embodiment disclosed, the collecting member 33 comprises a filter 34 catching possible debris particles in the flow of water. Furthermore, the collecting member 33 may comprise a container 35 which can be provided upstream and/or downstream the filter 34 and arranged to collect the debris particles caught by the filter 34. The collecting member 33 may be designed in many different ways, for instance as a cyclone where debris particles are caught by means of the centrifugal force.

Furthermore, the conduit member 31 comprises a cover 36 which is arranged to be attached to the upper part of the fuel assembly 3 and which defines a passage for the flow of water into the conduit member 31. The cover 36 is adapted in such a way that it sealingly encloses the upper part of the fuel assembly 3 and prevents inflow of water between the cover 36 and the upper part of the fuel assembly 3.

Furthermore, the device comprises a control unit 40, which is connected to the pump 32 and arranged to control the pump 32. By means of the control unit 40, the pump 32 can be controlled so that it creates a flow of water during the abovementioned lifting operation. The flow upwardly through the debris filter 7 and the fuel assembly 3 ought to have such a size during the lifting operation that possible debris particles which are contained in and/or immediately beneath the debris filter 7 at least are retained in and/or immediately beneath the debris filter 7. This means that the upwardly directed flow at the inlet of the fuel assembly 3 beneath the debris filter 7 ought to have a flow speed which is at least 0.4 m/s, preferably at least 0.5 m/s. Advantageously, the pump 32 is controlled in such a way that the flow is maintained during the whole lifting operation and in such a way that the flow is initiated as soon as the lifting operation has been initiated. Furthermore, the pump 32 may be controlled in such a way that the flow is maintained during the whole transport from the reactor vessel 1 via the transport path 12 to a position where the debris particles are depositable, such as in the disclosed water pool 11.

When the fuel assembly 3 has been transported to the water pool 11, the pump 32 may be controlled so that the flow of water through the fuel assembly 3 is reversed. In such a way, at least a part of the debris particles which are contained in the debris filter 7 may be deposited by being flushed out from the debris filter 7 and falling down into the water pool 11.

It is to be noted that it is possible to provide the pump 32 at a distance from the fuel assembly 3, for instance higher up at the grip element 18 or at a wail of the common space formed by the reactor vessel 1, the transport path 12 and the water pool 11. However, it is advantageous if the pump 32 is submergible and located beneath the water surface since possible debris particles transported through the pump 32 may be radioactively contaminated.

It is also to be noted that it is possible to convey the water from the pump 32 to any other place than back to the reactor vessel, for instance to any collecting vessel outside the reactor vessel 1. The water in such a collecting vessel may be cleaned and/or filtered and thereafter recycled to the reactor vessel 1 or removed from the plant.

The invention is not limited to the embodiments described and disclosed but may be varied and modified within the scope of the following claims.

The invention claimed is:

1. An arrangement comprising:
   a fuel assembly comprising a number of fuel rods extending between a lower part and a upper part of the fuel assembly, a casing which surrounds and forms a flow channel in which the fuel rods are located, and a debris filter which is located in the lower part of the fuel assembly, and
   a device for handling the fuel assembly, wherein the device comprises:
   a lifting device which during a lifting operation engages the fuel assembly located in a reactor vessel and lifts the fuel assembly upwardly and out from the reactor vessel,
   a conduit member connected to the upper part of the fuel assembly, the conduit member comprising a cover that defines a passage for a flow of water through the conduit member, the cover sealingly enclosing the upper part of the fuel assembly so as to prevent inflow of water between the cover and the upper part of the fuel assembly,
   a pump that creates the flow of water through the conduit member and the fuel assembly during the lifting operation, and
   a collecting member connected to the conduit member for collecting debris particles that accompany the flow of water through the fuel assembly,
   wherein the pump provides the flow of such a size that possible debris particles contained in and/or immediately beneath the debris filter at least are retained in and/or immediately beneath the debris filter during the lifting operation.

2. The arrangement according to claim 1, wherein the device controls the pump in such a way that the flow is maintained during the whole lifting operation.

3. The arrangement according to claim 1, wherein the device controls the pump in such a manner that the flow is initiated as soon as the lifting operation has been initiated.

4. The arrangement according to claim 1, wherein the lifting device comprises an elongated grip element which is arranged to be submerged in the reactor vessel and engage the fuel assembly, wherein the pump is provided on the grip element.

5. The arrangement according to claim 4, wherein the pump is mounted adjacent to the upper part of the fuel assembly.

6. The arrangement according to claim 1, wherein the conduit member conveys the flow to a position outside the fuel assembly.

7. The arrangement according to claim 1, wherein the collecting member comprises a filter.

8. The arrangement according to claim 1, wherein the collecting member comprises a container.

9. The arrangement according to claim 1, wherein the lifting device is arranged to transport the lifted fuel assembly to a water pool at a distance from the reactor vessel, wherein the device controls the pump in such a way that the flow is maintained during the whole of this transport.

10. The arrangement according to claim 9, wherein the device controls the pump in such a way that the flow of water through the fuel assembly is reversed in a position where the debris particles are depositable.

* * * * *